(12) United States Patent
Siegel

(10) Patent No.: US 10,398,939 B1
(45) Date of Patent: Sep. 3, 2019

(54) LOAD SHARING SNAP-LINKABLE SAFETY RIGGING PLATE

(71) Applicant: Robert A. Siegel, Waterford, WI (US)

(72) Inventor: Robert A. Siegel, Waterford, WI (US)

(73) Assignee: MALLORY SAFETY & SUPPLY, LLC, Longview, WA (US)

( * ) Notice: Subject to any disclaimer, the term of this patent is extended or adjusted under 35 U.S.C. 154(b) by 78 days.

(21) Appl. No.: 15/893,440

(22) Filed: Feb. 9, 2018

(51) Int. Cl.
*A63B 29/00* (2006.01)
*A44B 13/00* (2006.01)
*A44B 13/02* (2006.01)
*F16B 45/02* (2006.01)

(52) U.S. Cl.
CPC .......... *A63B 29/00* (2013.01); *A44B 13/0058* (2013.01); *A44B 13/02* (2013.01); *A44D 2200/12* (2013.01); *F16B 45/02* (2013.01)

(58) Field of Classification Search
CPC ..... A63B 29/00; A44B 13/02; A44B 13/0058; F16B 45/02; A44D 2200/12
See application file for complete search history.

(56) References Cited

U.S. PATENT DOCUMENTS

| | | | | |
|---|---|---|---|---|
| 307,280 A * | 10/1884 | Farmer | ................ | F16B 45/02 24/582.11 |
| 547,877 A * | 10/1895 | Covert | ................ | F16B 45/02 24/582.11 |
| 760,171 A * | 5/1904 | Atwell | ................ | A44B 11/28 24/165 |
| 1,025,666 A * | 5/1912 | Yeagle | ................ | F16B 45/02 24/598.4 |
| 1,709,235 A * | 4/1929 | Shaffer | ................ | F16B 45/02 24/375 |
| 5,005,266 A * | 4/1991 | Fister | ................ | F16B 45/02 24/599.8 |
| 5,210,914 A * | 5/1993 | Katsma | ................ | F16B 45/02 24/588.1 |
| 5,940,943 A * | 8/1999 | Kloster | ................ | F16B 45/02 24/583.11 |
| 6,336,260 B1 * | 1/2002 | Mauthner | ................ | F16B 45/02 24/376 |
| 7,029,353 B2 * | 4/2006 | Goodman | ................ | B63C 9/26 294/82.2 |
| 7,036,780 B1 * | 5/2006 | Geninatti | ................ | A63B 29/02 114/230.1 |
| D701,109 S * | 3/2014 | Kelleghan | ................ | D8/356 |
| 9,255,602 B2 * | 2/2016 | Liang | ................ | F16B 45/02 |

(Continued)

*Primary Examiner* — Robert Sandy
*Assistant Examiner* — Louis A Mercado
(74) *Attorney, Agent, or Firm* — Donald J. Ersler

(57) ABSTRACT

A load sharing snap-linkable safety rigging plate preferably includes a rigging body, a first gate, a second gate, two first pivoting locks and two second pivoting locks. The rigging body includes a base portion, a first open gate loop and a second open gate loop. A plurality of openings are formed through the base portion. The first and second gates are pivotally engaged with first and second ends of the base portion. The second gate is pivotally engaged with a second end of the base portion and an opposing end is retained by an end of the second open gate loop. The first two pivoting locks are pivotally retained on a first end of the base portion to prevent the first gate from opening. The second two pivoting locks are pivotally retained on a second end of the base portion to prevent the second gate from opening.

12 Claims, 7 Drawing Sheets

(56) References Cited

U.S. PATENT DOCUMENTS

| | | | |
|---|---|---|---|
| 9,441,665 B2 * | 9/2016 | Liang ...................... | F16B 45/02 |
| 10,295,087 B2 * | 5/2019 | Chouinard ................ | E04C 3/04 |
| D850,241 S * | 6/2019 | Ormsbee ........................ | D8/356 |
| 2010/0306974 A1 * | 12/2010 | Munoz ................... | F16B 45/02 |
| | | | 24/598.8 |
| 2019/0017535 A1 * | 1/2019 | Ormsbee ................ | F16B 45/02 |

* cited by examiner

LOAD SHARING SNAP-LINKABLE SAFETY RIGGING PLATE

BACKGROUND OF THE INVENTION

1. Field of the Invention

The present invention relates generally to work and rescue at height and more specifically to a load sharing snap-linkable safety rigging plate, which may be used to relieve pressure on the waist and hips of a climber.

2. Discussion of the Prior Art

It appears that the prior art does not teach or suggest a load sharing snap-linkable safety rigging plate, which may be used to rig for single point or double point positioning, while supporting multiple organized attachment points. The positioning includes tandem adjustable lanyards similar to Gorilla Grips; single point-controlled descent (rappel); and single point positioning with swivel link connection points. The multiple attachment capability allows the user to transfer from one system set up to another while remaining secured by the way of a restraint connection. When rigged as a rope access/tower climber advanced positioning travel system, the technician can travel freely both within suspension (aid climbing) and non-suspended activities (but must be used with a fall arrest system).

Accordingly, there is a clearly felt need in the art for a load sharing snap-linkable safety rigging plate, which may be used as a tower climber plate for load sharing between two closed ring attachments; rope access/tower climber advanced positioning travel system; a rigging/rescue anchor plate; and which is snag proof.

SUMMARY OF THE INVENTION

The present invention provides a load sharing snap-linkable safety rigging plate, which may be used to relieve pressure on the waist and hips of a climber; and/or under rescue life safety systems and assemblies. The load sharing snap-linkable safety rigging plate (rigging plate) preferably includes a rigging body, a first gate, a second gate, two first pivoting locks and two second pivoting locks. The rigging body includes a base portion, a first open gate loop and a second open gate loop. The first open gate loop extends from one end of the base portion and the second open gate loop extends from an opposing end of the base portion. A first reduced thickness is formed on a portion of an end of the first open gate loop and on an inside thereof. A second reduced thickness is formed on a portion of an end of the second open gate loop and on an inside thereof.

A pair of upper line holes are formed in opposing ends of the base portion at a top thereof. A center opening is formed between the pair of line holes. A first gate pivot hole is formed adjacent a first of the pair of upper line holes and a second gate pivot hole is formed adjacent a second of the pair of upper line holes. A lower line hole is formed below the center opening. A first lock cavity is formed on one side of the lower line hole and in both sides of the base portion. A first pivot hole is formed through the first lock cavity. A first pivot slot is formed through the first lock cavity. A second lock cavity is formed on an opposing side of the lower line hole and in both sides of the base portion. A second pivot hole is formed through the second lock cavity. A second pivot slot is formed through the second lock cavity.

The first gate includes a first pivot yoke and a first stop cavity. The first pivot yoke is formed in one end of the first gate and the first stop cavity is formed in an opposing end. The first pivot yoke creates a pair of first pivot plates. A first pivot hole is formed through an end of the first pivot plates. A width of the first pivot yoke is sized to receive a thickness of the base portion. The first stop cavity is sized to receive the first reduced thickness. The second gate includes a second pivot yoke and a second stop cavity. The second pivot yoke is formed in one end of the second gate and the second stop cavity is formed in an opposing end. The second pivot yoke creates a pair of second pivot plates. The second pivot hole is formed through an end of the second pivot plates. A width of the second pivot yoke is sized to receive a thickness of the base portion. The second stop cavity is sized to receive the second reduced thickness.

Each pivoting lock includes a substantially triangular shape, a pivot hole, a pivot slot hole and a push projection. The pivot hole is formed in one end of the pivoting lock and the push projection extends outward from a front at an opposing end. The pivot slot hole is formed between the pivot hole and the push projection. A torsion spring slot is formed in a rear of the pivoting lock, substantially concentric to the pivot hole to receive a torsion spring.

Accordingly, it is an object of the present invention to provide a rigging plate, which may be used as a tower climber plate for load sharing between two closed ring attachments; rope access/tower climber advanced positioning travel system; a rigging/rescue anchor plate; lowering and raising within confined spaces; and which is snag proof.

Finally, it is another objection of the present invention to provide a rigging plate, which will also act These and additional objects, advantages, features and benefits of the present invention will become apparent from the following specification.

DETAILED DESCRIPTION OF THE PREFERRED EMBODIMENTS

Figure 1:
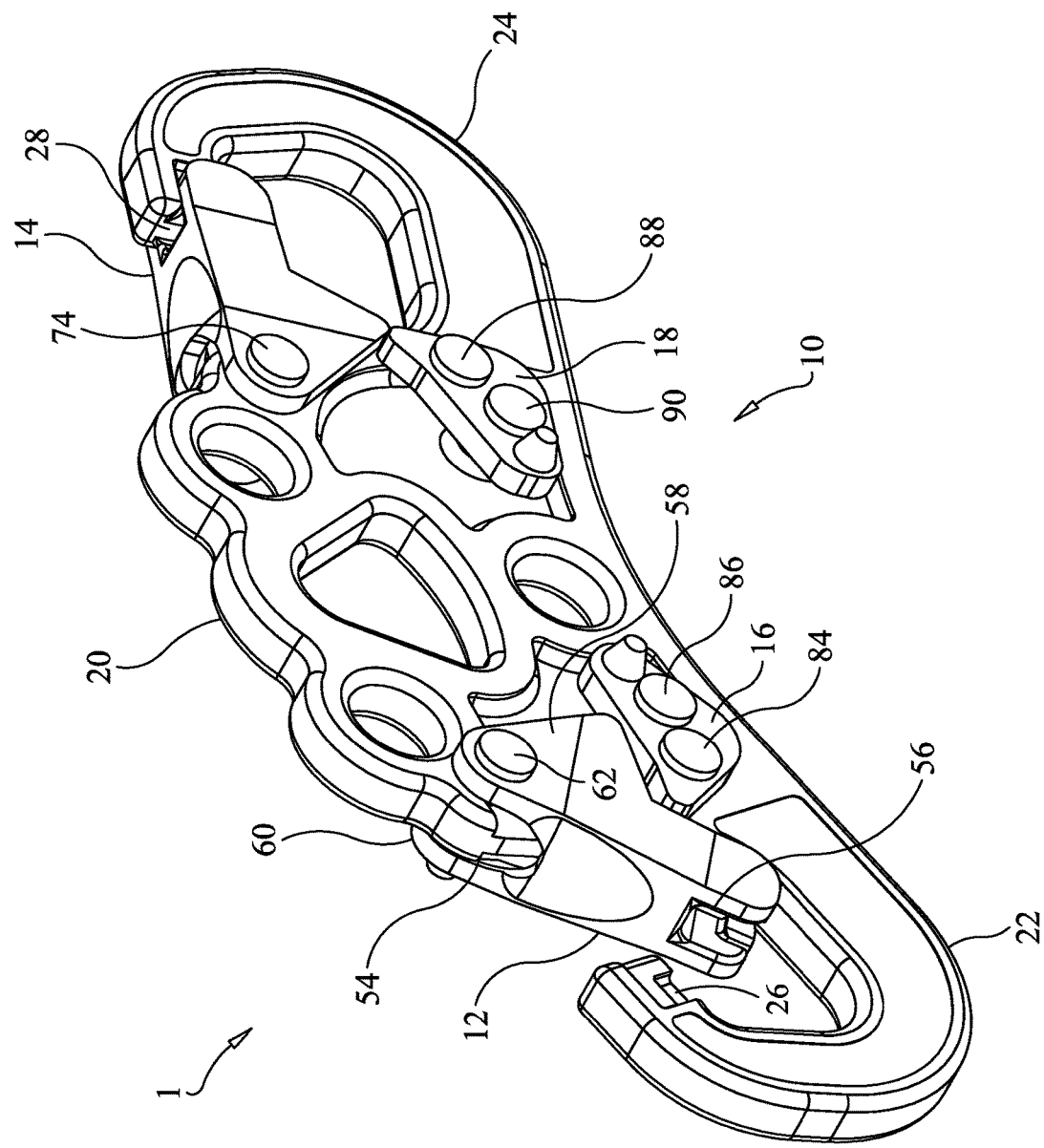
FIG. 1 is a perspective view of a rigging plate in accordance with the present invention.
Figure 2:
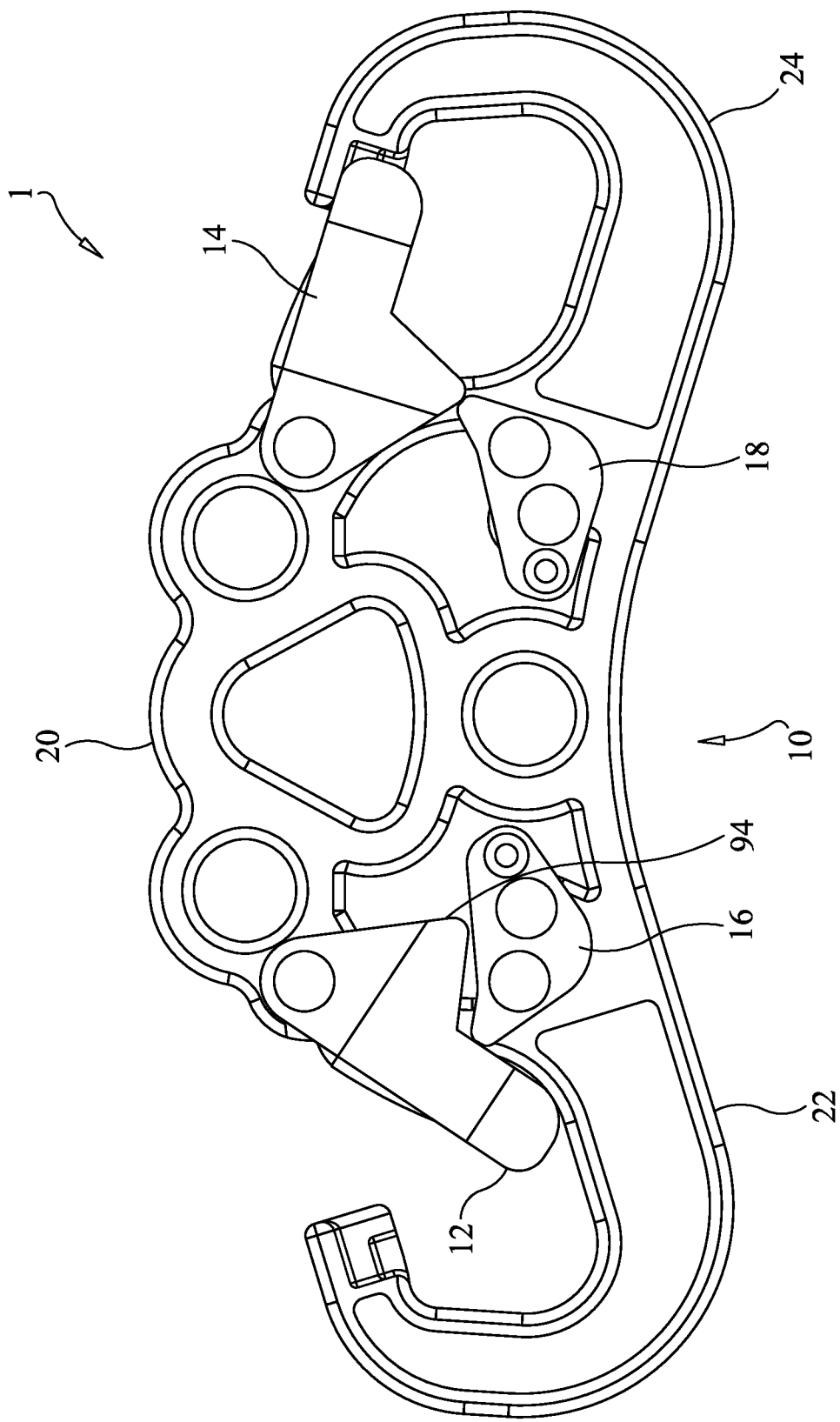
FIG. 2 is a front view of a rigging plate in accordance with the present invention.
Figure 3:
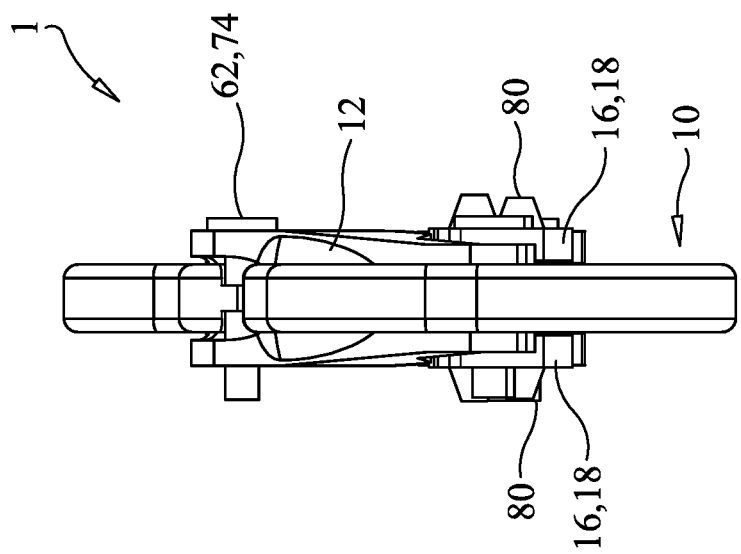
FIG. 3 is an end view of a rigging plate in accordance with the present invention.
Figure 4:
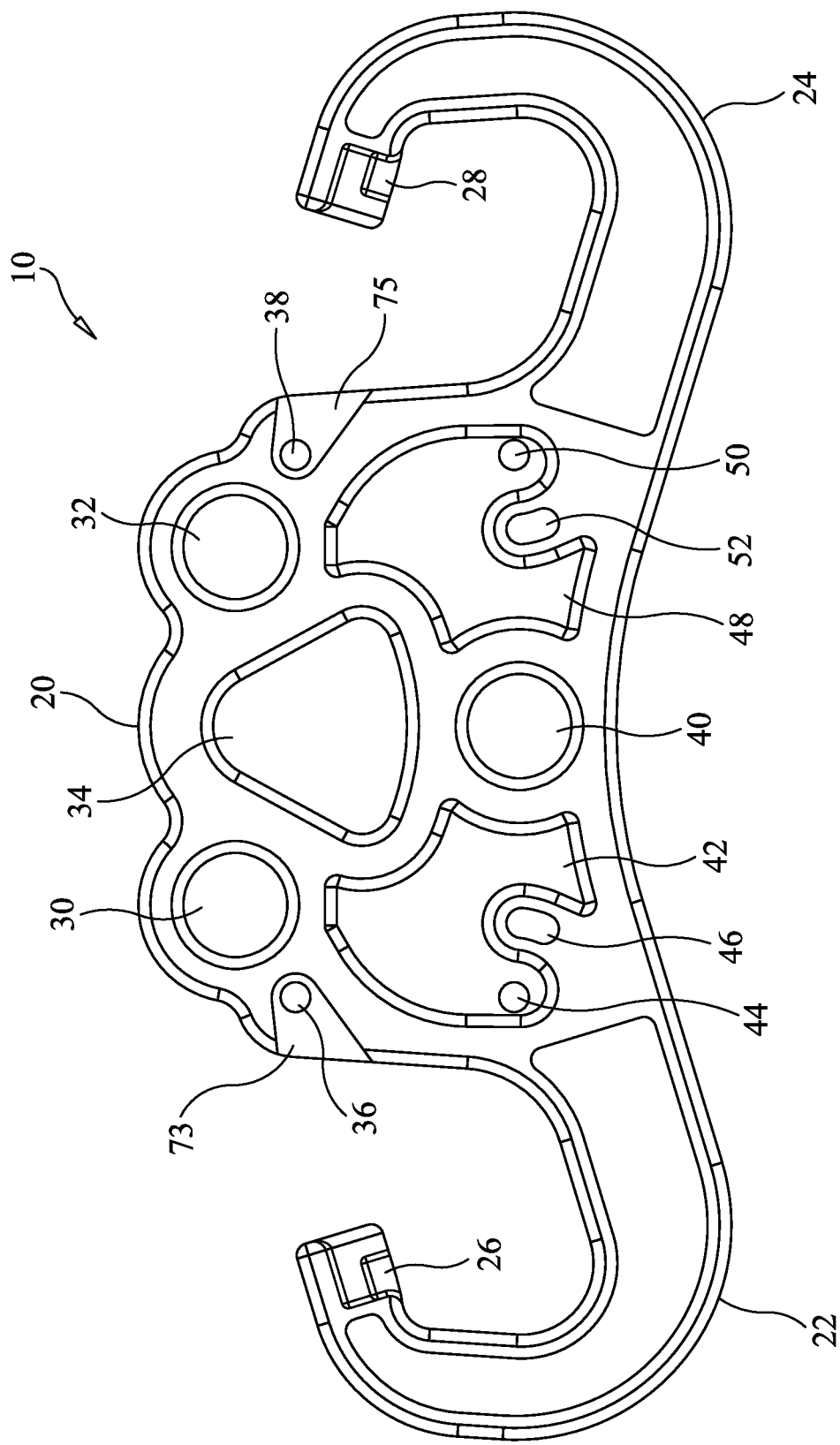
FIG. 4 is a front view of a rigging body of a rigging plate in accordance with the present invention.

With reference now to the drawings, and particularly to FIG. 1, there is shown a perspective view of a rigging plate 1. With reference to FIGS. 2-3, the rigging plate 1 preferably includes a rigging body 10, a first gate 12, a second gate 14, two first pivoting locks 16 and two second pivoting locks 18. With reference to FIG. 4, the rigging body 10 includes a base portion 20, a first open gate loop 22 and a second open gate loop 24. A rear view of the rigging body 10 is identical to the front view of the rigging body 10. The first open gate loop 22 extends from one end of the base portion 20 and the second open gate loop 24 extends from an opposing end of the base portion 20. A first reduced thickness 26 is formed on a portion of an end of the first open gate loop 22 and on an inside thereof. A second reduced thickness 28 is formed on a portion of an end of the second open gate loop 24 and on an inside thereof.

A first upper line hole 30 is formed on a first end of the base portion 20 at a top thereof and a second upper line hole 32 is formed on a second end of the base portion 20 at a top thereof. A center opening 34 is formed between the first and second upper line holes 30, 32. The center opening 34 preferably has a substantially triangular shape with round corners. A first gate pivot hole 36 is formed adjacent the first upper line hole 30 and a second gate pivot hole 38 is formed adjacent the second upper line hole 38. A lower line hole 40 is formed below the center opening 34. Two first lock cavities 42 are formed on a first side of the lower line hole 40 and in a front and back of the base portion 20. A first pivot hole 44 is formed through the first lock cavities 42. A first pivot slot 46 is formed through the base portion 20. A second lock cavity 48 is formed on a second side of the lower line hole 40 and in a front and back of the base portion 20. A second pivot hole 50 is formed through the second lock cavities 48. A second pivot slot 52 is formed through the base portion 20.

Figure 5:
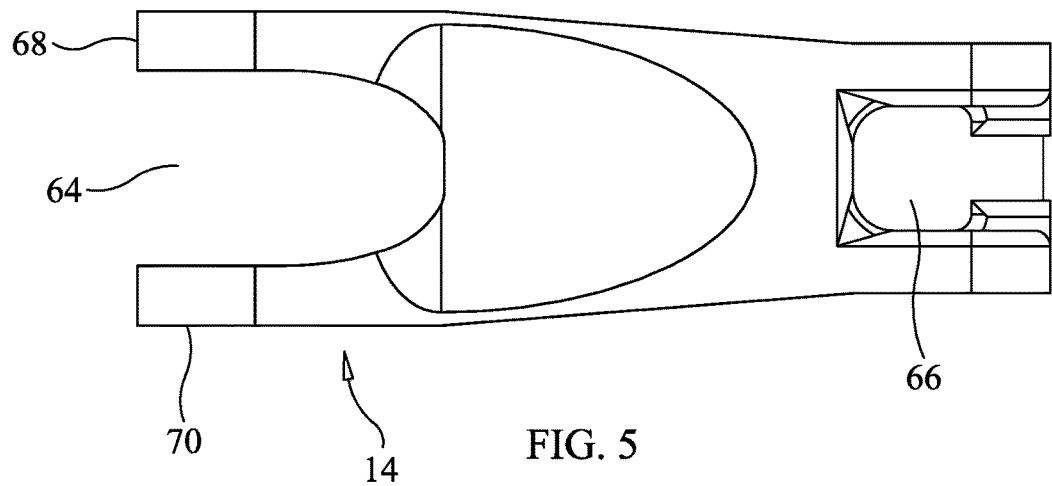
FIG. 5 is a top view of a second gate of a rigging body of a rigging plate in accordance with the present invention.
Figure 6:
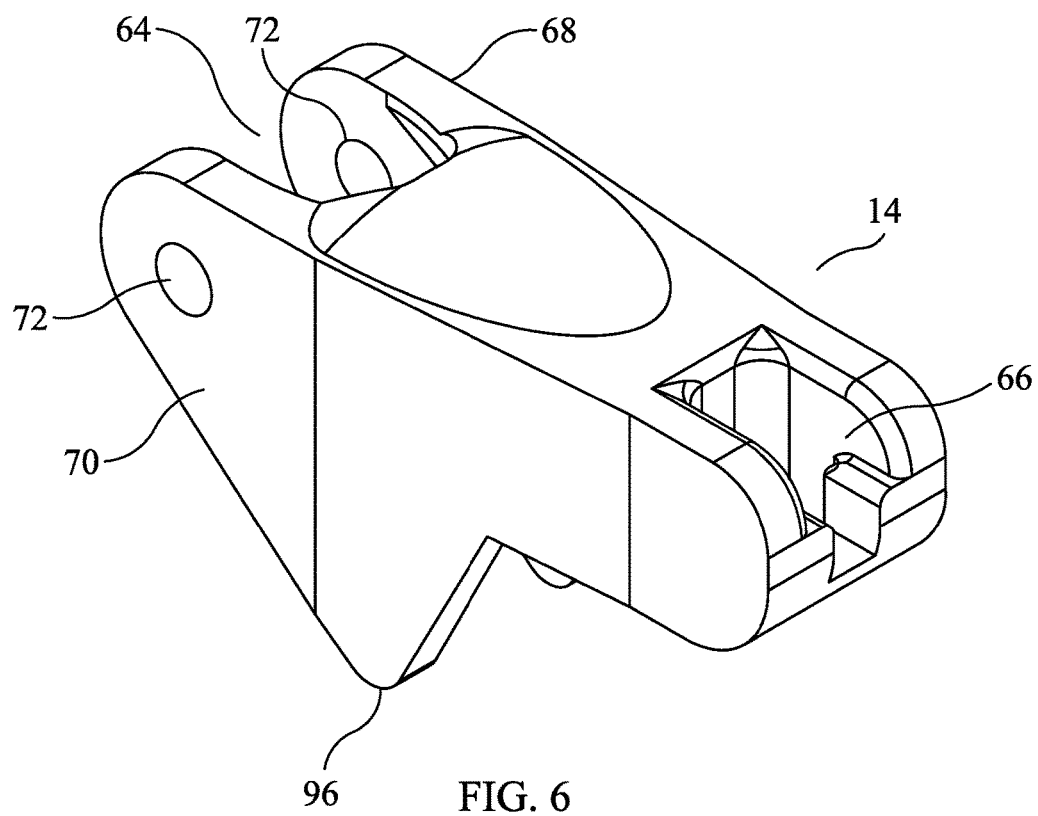
FIG. 6 is a perspective view of a second gate of a rigging body of a rigging plate in accordance with the present invention.

The first gate 12 includes a first pivot yoke 54 and a first stop cavity 56. The first pivot yoke 54 is formed in one end of the first gate 12 and the first stop cavity 56 is formed in an opposing end. The first pivot yoke 54 creates a pair of first pivot plates 58, 60. A first pivot hole is formed through an end of the first pivot plates 58, 60. A first pivot pin 62 is retained in the first pivot hole and the base portion 20. A width of the first pivot yoke 54 is sized to receive a thickness of the base portion 20. The first stop cavity 56 is sized to receive the first reduced thickness 26. With reference to FIGS. 5-6, the second gate 14 includes a second pivot yoke 64 and a second stop cavity 66. The second pivot yoke 14 is formed in one end of the second gate 14 and the second stop cavity 66 is formed in an opposing end. The second pivot yoke 14 creates a pair of second pivot plates 68, 70. The second pivot hole 72 is formed through an end of the second pivot plates 68, 70. A second pivot pin 74 is retained in the second pivot hole 72 and the base portion 20. A width of the second pivot yoke 64 is sized to receive the thickness of the base portion 20. The second stop cavity 66 is sized to receive the second reduced thickness 28. The engagement of the first gate loop 22 and the first gate 12 forms a first closed loop. The engagement of the second gate loop 24 and the second gate 14 forms a second closed loop. A first torsion spring cavity 73 is formed on a front and rear of the base portion 20 concentric with the first gate pivot hole 36 to receive a first gate torsion spring (not shown). A second torsion spring cavity 75 is formed on a front and rear of the base portion 20 concentric with the second gate pivot hole 38 to receive a second gate torsion spring (not shown). The first and second torsion springs bias the first and second gates 12, 14 into a closed position.

Figure 7:
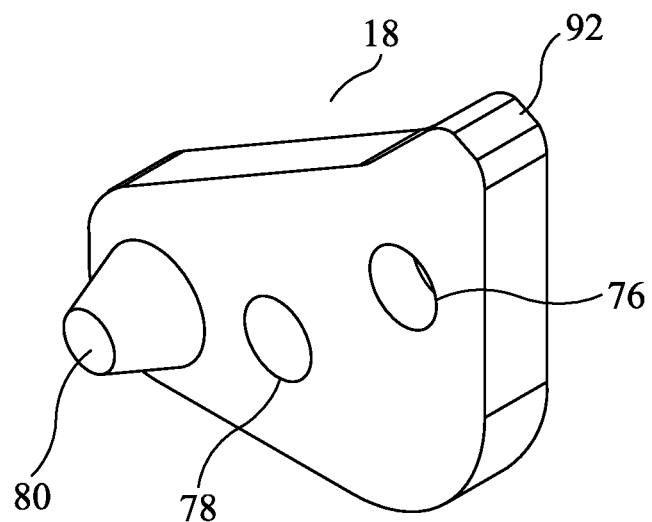
FIG. 7 is a perspective view of a second gate of a rigging body of a rigging plate in accordance with the present invention.
Figure 8:
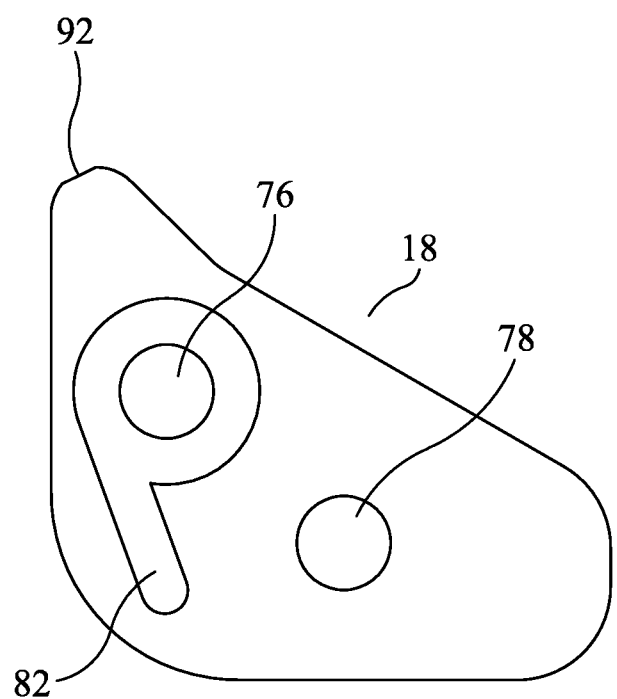
FIG. 8 is a rear view of a second gate of a rigging body of a rigging plate in accordance with the present invention.

With reference to FIGS. 7-8, the first and second pivoting locks 16, 18 include a substantially triangular shape, a pivot hole 76, a pivot slot hole 78 and a push projection 80. The pivot hole 76 is formed in one end of the second pivoting lock 18 and the push projection 80 extends outward from a front of an opposing end. A torsion spring slot 82 is formed in a rear of the second pivoting lock 18, substantially concentric to the pivot hole 76 to receive a torsion spring (not shown). The first and second pivoting locks 16, 18 are preferably normally biased toward the first and second gates 12, 14 with the torsion springs. A first pivot pin 84 is retained in the pivot holes 76 of the first pivoting locks 16 and the first pivot hole 44 of the base portion 20. A first slide pin 86 is retained in the pivot slot holes 78 of the first pivoting locks 16 and the first pivot slot 46. A second pivot pin 88 is retained in the pivot holes 76 of the second pivoting locks 18 and the second pivot hole 50 of the base portion 20. A second slide pin 90 is retained in the pivot slot holes 78 of the second pivoting locks 18 and the second pivoting slot 52.

Figure 9:
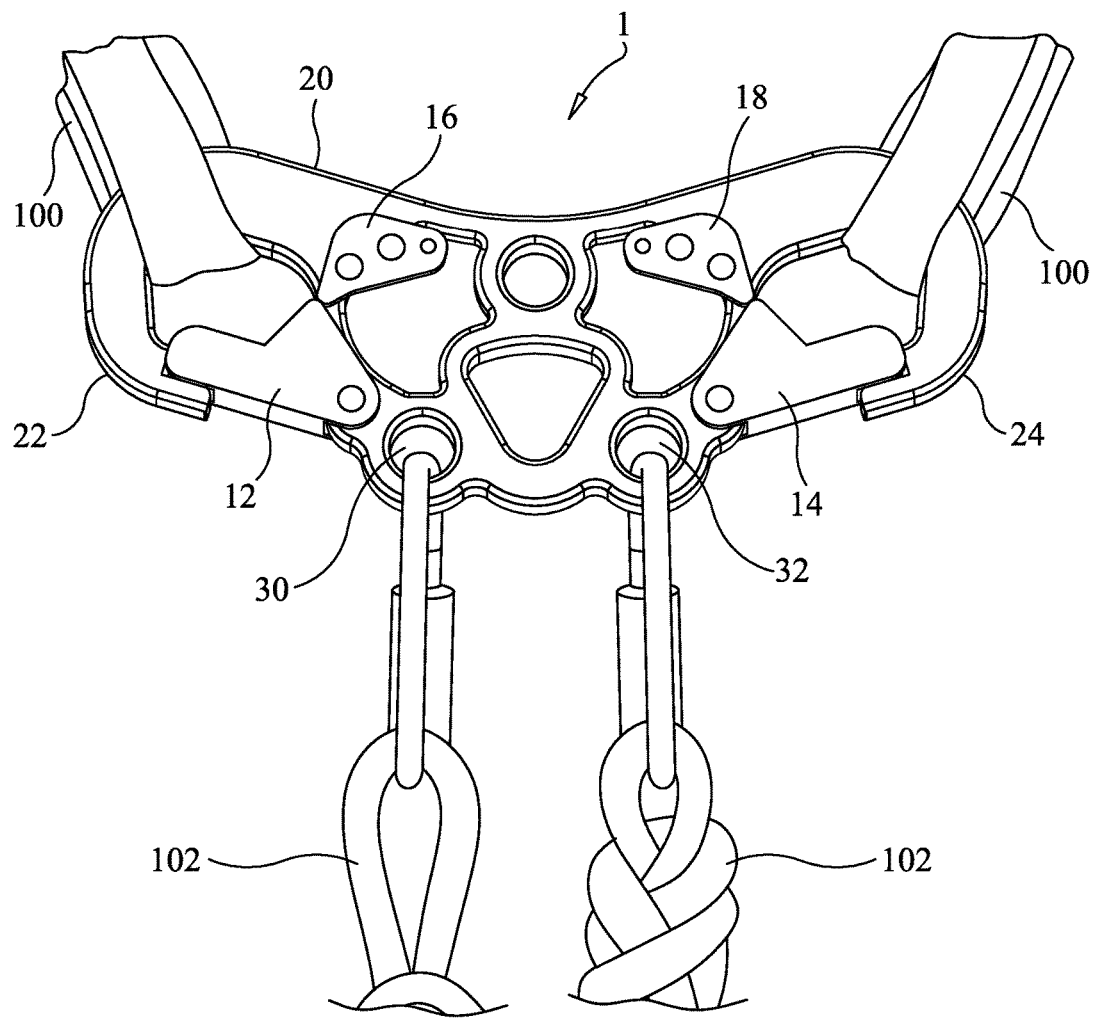
FIG. 9 is a front perspective view of a rigging plate with a pair of straps and a pair ropes attached thereto in accordance with the present invention.
Figure 10:
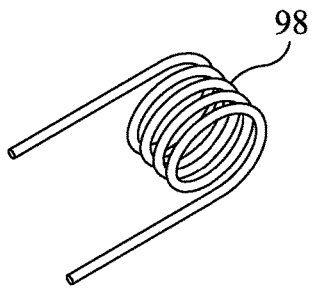
FIG. 10 is a perspective view of a torsion spring used in a rigging plate in accordance with the present invention.

FIG. 9 shows a pair of straps 100 retained on the first and second open gate loop 22, 24 and a pair of ropes 102 retained in the two upper line holes 30, 32 of an inverted rigging plate 1. In use, the first or second gates 12, 14 are released by pivoting the first or second stops 16, 18, upward so the first or second gates 12, 14 may pivot downward. A lock corner 92 of said first or second pivoting locks 16, 18 is in contact with a support corner 94 of the first gate 12 or a support corner 96 of the second gate 14. FIG. 10 illustrates a torsion spring 98 used to bias the first or second gate 12, 14 and the first or second pivoting lock 16, 18.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A rigging plate comprising:
   a rigging body includes a base portion, a first open gate loop and a second open gate loop, said first open gate loop extends from a first end of said base portion, said second open gate loop extends from a second end of said base portion;
   a first gate having one end pivotally engaged with said first end of said base portion, an opposing end of said first gate is capable of being engaged with an end of said first open gate loop;
   a second gate having one end pivotally engaged with said second end of said base portion, an opposing end of said second gate is capable of being engaged with an end of said second open gate loop;
   at least one first pivoting lock being pivotally retained on said base portion to lock said opposing end of said first gate to said end of said first open gate loop; and
   at least one second pivoting lock being pivotally retained on said base portion to lock said opposing end of said second gate to said end of said second open gate loop.

2. The rigging plate of claim 1 further comprising:
   an additional first pivoting lock is pivotally retained on a rear of said base portion, an additional second pivoting lock is pivotally retained on a rear of said base portion.

3. The rigging plate of claim 1, further comprising:
   said first gate is biased to be closed with a first gate torsion spring, said second gate is biased to be closed with a second gate torsion spring.

4. The rigging plate of claim 1, further comprising:
   said first pivoting lock is biased to contact said first gate with a first lock torsion spring, said second pivoting lock is biased to contact said second gate with a second lock torsion spring.

5. A rigging plate comprising:

a rigging body includes a base portion, a first open gate loop and a second open gate loop, said first open gate loop extends from a first end of said base portion, said second open gate loop extends from a second end of said base portion, at least one opening is formed through said rigging body for an attachment of at least one of a strap and a rope;

a first gate having one end pivotally engaged with said first end of said base portion, an opposing end of said first gate is capable of being engaged with an end of said first open gate loop;

a second gate having one end pivotally engaged with said second end of said base portion, an opposing end of said second gate is capable of being engaged with an end of said second open gate loop;

at least one first pivoting lock being pivotally retained on said base portion to lock said opposing end of said first gate to said end of said first open gate loop; and at least one second pivoting lock being pivotally retained on said base portion to lock said opposing end of said second gate to said end of said second open gate loop.

6. The rigging plate of claim 5 further comprising:

an additional first pivoting lock is pivotally retained on a rear of said base portion, an additional second pivoting lock is pivotally retained on a rear of said base portion.

7. The rigging plate of claim 5, further comprising:

said first gate is biased to be closed with a first gate torsion spring, said second gate is biased to be closed with a second gate torsion spring.

8. The rigging plate of claim 5, further comprising:

said first pivoting lock is biased to contact said first gate with a first lock torsion spring, said second pivoting lock is biased to contact said second gate with a second lock torsion spring.

9. A rigging plate comprising:

a rigging body includes a base portion, a first open gate loop and a second open gate loop, said first open gate loop extends from a first end of said base portion, said second open gate loop extends from a second end of said base portion, at least one opening is formed through said rigging body for an attachment of at least one of a strap and a rope;

a first gate having one end pivotally engaged with said first end of said base portion, an opposing end of said first gate is capable of being engaged with an end of said first open gate loop;

a second gate having one end pivotally engaged with said second end of said base portion, an opposing end of said second gate is capable of being engaged with an end of said second open gate loop;

at least one first pivoting lock being pivotally retained on said base portion to lock said opposing end of said first gate to said end of said first open gate loop, said at least one first pivoting lock is in contact with said first gate to lock said first gate; and at least one second pivoting lock being pivotally retained on said base portion to lock said opposing end of said second gate to said end of said second open gate loop, said at least one second pivoting lock is in contact with said second gate to lock said second gate.

10. The rigging plate of claim 9 further comprising:

an additional first pivoting lock is pivotally retained on a rear of said base portion, an additional second pivoting lock is pivotally retained on a rear of said base portion.

11. The rigging plate of claim 9, further comprising:

said first gate is biased to be closed with a first gate torsion spring, said second gate is biased to be closed with a second gate torsion spring.

12. The rigging plate of claim 9, further comprising:

said first pivoting lock is biased to contact said first gate with a first lock torsion spring, said second pivoting lock is biased to contact said second gate with a second lock torsion spring.

\* \* \* \* \*